(12) United States Patent
Lorenz

(10) Patent No.: US 10,569,888 B2
(45) Date of Patent: Feb. 25, 2020

(54) LEADING EDGE ICE-PROTECTION SYSTEM

(71) Applicant: Airbus Operations GmbH, Hamburg (DE)

(72) Inventor: Florian Lorenz, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 239 days.

(21) Appl. No.: 15/845,298

(22) Filed: Dec. 18, 2017

(65) Prior Publication Data

US 2018/0170557 A1 Jun. 21, 2018

(30) Foreign Application Priority Data

Dec. 20, 2016 (DE) .......................... 10 2016 125 026

(51) Int. Cl.
*B64D 15/00* (2006.01)
*B64D 15/04* (2006.01)
*B64C 21/02* (2006.01)

(52) U.S. Cl.
CPC .............. *B64D 15/04* (2013.01); *B64C 21/02* (2013.01); *B64C 2230/10* (2013.01)

(58) Field of Classification Search
CPC ........ B64D 15/00; B64D 15/02; B64D 15/04; B64D 15/12; B64D 15/14; B64C 2230/10
See application file for complete search history.

(56) References Cited

U.S. PATENT DOCUMENTS

| 1,868,468 A * | 7/1932 | Thompson | B64D 15/12 244/134 D |
| 4,752,049 A * | 6/1988 | Cole | B64D 15/04 244/134 B |
| 2012/0318922 A1* | 12/2012 | Saito | B64C 3/28 244/134 B |
| 2013/0228653 A1* | 9/2013 | Breer | B64D 15/12 244/134 D |
| 2016/0257418 A1* | 9/2016 | Caruel | B64D 33/02 |
| 2017/0043877 A1* | 2/2017 | Bouillon | F01D 25/02 |
| 2017/0233084 A1* | 8/2017 | Ichikawa | B64D 15/04 244/134 B |

\* cited by examiner

*Primary Examiner* — Richard G Davis
(74) *Attorney, Agent, or Firm* — Greer, Burns & Crain, Ltd.

(57) ABSTRACT

An ice-protection system for an aerodynamic structure for an aircraft comprising: an outer skin defined by a leading edge point and a trailing edge point that are interconnected by an upper skin and a lower skin, an internal chamber defined within the outer skin configured to be in fluid communication with the atmosphere external to the outer skin via an inlet and an outlet, and at least one air heater provided within the chamber in proximity to the inlet, wherein during use, a pressure differential exists between the inlet and the outlet that causes external air to flow through the chamber from the inlet to the outlet, and wherein the heater is configured to heat the air passing through the inlet such that the temperature of the air in the chamber is sufficiently increased so as to prevent ice accretion on the outer skin.

15 Claims, 4 Drawing Sheets

LEADING EDGE ICE-PROTECTION SYSTEM

CROSS-REFERENCES TO RELATED APPLICATIONS

This application claims the benefit of the German patent application No. 10 2016 125 026.0 filed on Dec. 20, 2016, the entire disclosures of which are incorporated herein by way of reference.

FIELD OF TECHNOLOGY

The present technology relates to an ice-protection system suitable for an aerodynamic structure of an aircraft.

BACKGROUND OF THE INVENTION

For an aircraft, structures such as the wing and its high-light devices, horizontal and vertical tail planes, propellers, engine intakes, are prone to icing. This is undesirable when in use because the ice destroys the smooth flow of air over the structure, therefore decreasing the ability of the airfoil to perform its intended function and also increases drag and weight of the aircraft. Aircraft certified for flight in icing conditions are therefore normally fitted with de-icing and anti-icing systems, which when required, are used to remove ("de-ice") or prevent ("anti-ice) a buildup of ice on aerodynamic surfaces of the aircraft structure.

Ice buildup is normally critical on the leading edge of such structures. If a buildup of ice is not prevented or removed from these surfaces, then the ice can lead to the degradation of the aerodynamic performance of the structure. The ice may also lead to a significant weight increase to the aircraft or potentially block an intake to an engine.

Different variations of such systems exist. Normally a pneumatic system is provided within a leading-edge structure. Such a system withdraws hot bleed-air from the engines via a manifold and pipes the air to the interior of the leading edge of the wing and slats and release it via a perforated "Piccolo" tube. Such arrangements are commonly used in large passenger aircraft but they have their disadvantages. Bleed air from the engine is normally bled off at high pressure and temperature. The piping used to route the bleed air as a result is made of high performance metallic alloys such as titanium, which increases the cost. The routing normally extends substantially over the entire wing span of the aircraft. An associated control and monitoring system consisting of actuatable valves, as well as pressure, temperature and overheating sensors is required in order to regulate the flow of hot air and to avoid structural damage in the event of valve malfunction. Overall, this means the systems normally carry a relatively high weight penalty, which is increased due to the surrounding structure also having to be sized adequately to support the piping. Furthermore, the integration of such systems into leading edge moveable slats, adds complexity to the design and in some cases it can limit the use of thin airfoil sections due to the required size of the piccolo tubing within the slat itself.

Electrically powered systems are also known. Such electrically powered systems are usually configured to draw current from an aircraft's electrical power generator in order to power heater mats or coatings that are embedded within or laminated directly to the outer skin of the wing leading edge or the leading edge slat. The mats are in direct contact so as to ensure adequate conduction of the heat energy to the airfoil surface by the heater mat or coating. An associated control and monitoring system consisting of temperature sensors is required in order to carefully regulate the temperature of the heater mat attached directly to the structure. The tolerances of this monitoring system are normally small because any overheating of the laminated heating mat can have an immediately impact the structure to which it is attached. Furthermore, having a heater mat or coating which is essentially part of the structure, results in a system which is difficult to repair without substantial disassembly of the surrounding structure, which may result in prolonging the amount of time that an aircraft is out of service.

SUMMARY OF THE INVENTION

In view of the above it can be considered an object of the present technology to provide a less complex and lighter ice protection system. A further object of the present technology is to provide a system with improved serviceability.

An embodiment of the present technology provides an ice-protection system for an aerodynamic structure for an aircraft comprising: an outer skin defined by a leading edge point and a trailing edge point that are interconnected by an upper skin and a lower skin, an internal chamber defined within the outer skin configured to be in fluid communication with the atmosphere external to the outer skin via an inlet and an outlet, and at least one air heater element provided within the chamber in proximity to the inlet, wherein during use, a pressure differential exists between the inlet and the outlet that causes external air to flow through the chamber from the inlet to the outlet, and wherein the heater element is configured to heat the air passing through the inlet such that the temperature of the air in the chamber is sufficiently increased so as to prevent ice accretion on the outer skin.

A further embodiment of the present technology provides an ice-protection system further comprising an internal baffle configured to provide a passage between the inlet and the outlet.

Another embodiment of the present technology provides an ice-protection system wherein an internal baffle is configured to provide a passage that extends substantially along the leading edge and upper skin in close proximity.

A further embodiment of the present technology provides an ice-protection system wherein the internal baffle may also be configured to provide a throttling passage for air flowing through it.

Another embodiment of the present technology provides an ice-protection system wherein the heater element may be housed in a thermally insulated mount which is configured to prevent excessive heat energy being conducted directly from the heating element to the surrounding structure.

A further embodiment of the present technology provides an ice-protection system further comprising a control unit connected to the heater element and a temperature sensor positioned in proximity to the outlet and also connected to the control unit, wherein the control unit and sensor are configured to control the heat energy radiated by the heater element so as to maintain the temperature of the air passing through the chamber to a preset temperature.

An aerodynamic structure such as a leading edge of at least one slat, wing tip device, wing, horizontal tail plane, vertical tail plane or engine nacelle may comprise an ice-protection system according any of the embodiments so far described. An aircraft may comprise such an aerodynamic structure and de-ice system. Advantages of the present technology will now become apparent from the detailed description with appropriate reference to the accompanying drawings.

BRIEF DESCRIPTION OF THE DRAWINGS

Embodiments of the technology will now be described, by way of example only, with reference to the following drawings in which.

DETAILED DESCRIPTION OF THE PREFERRED EMBODIMENTS

Figure 1:
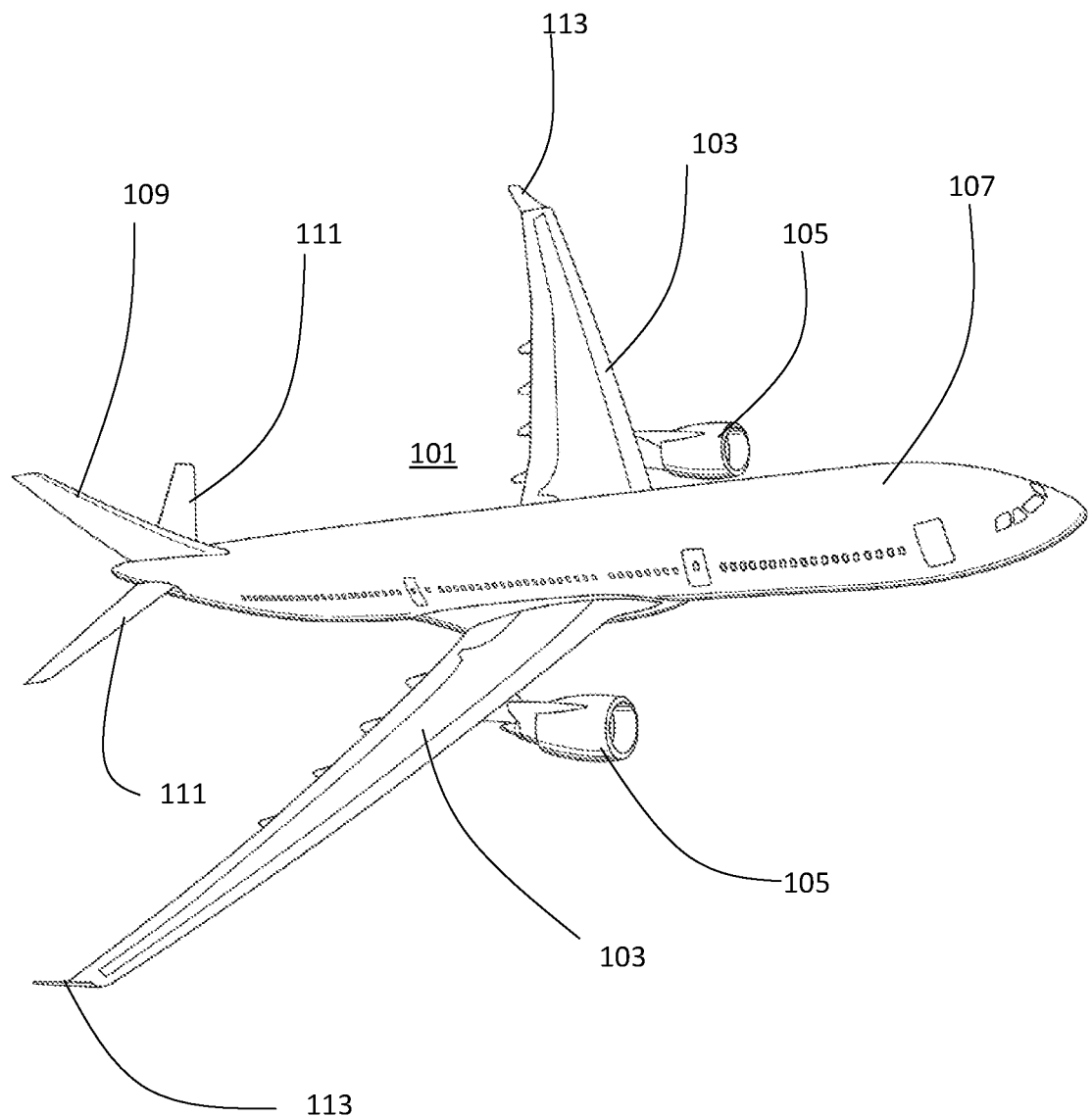
FIG. 1 is an isometric front view of an aircraft comprising a leading edge slat and an ice-protection system according to the present technology.

With reference to FIG. 1, an aircraft 101 comprises a pair of aerodynamic structures in the form of wings 103 that join into a fuselage 107. Each wing 103 comprises a leading edge and a trailing edge bounded by an upper wing surface and lower wing surface. Such aerodynamic structures are configured to generate a lift force by creating a pressure differential between the upper surface (low pressure) and lower surface (high pressure) when subjected to an aerodynamic flow.

Each wing 103 carries an engine 105 that is mounted using a wing to engine pylon. The aircraft 101 comprises further lifting surface assemblies in the form a horizontal tail plane 111 and a vertical tail plane 109, each attached at the rear of the fuselage 107.

The aircraft 101 further comprises a set of wing tip devices 113, which are each attached at a distal end of a wing 103.

Figure 2:
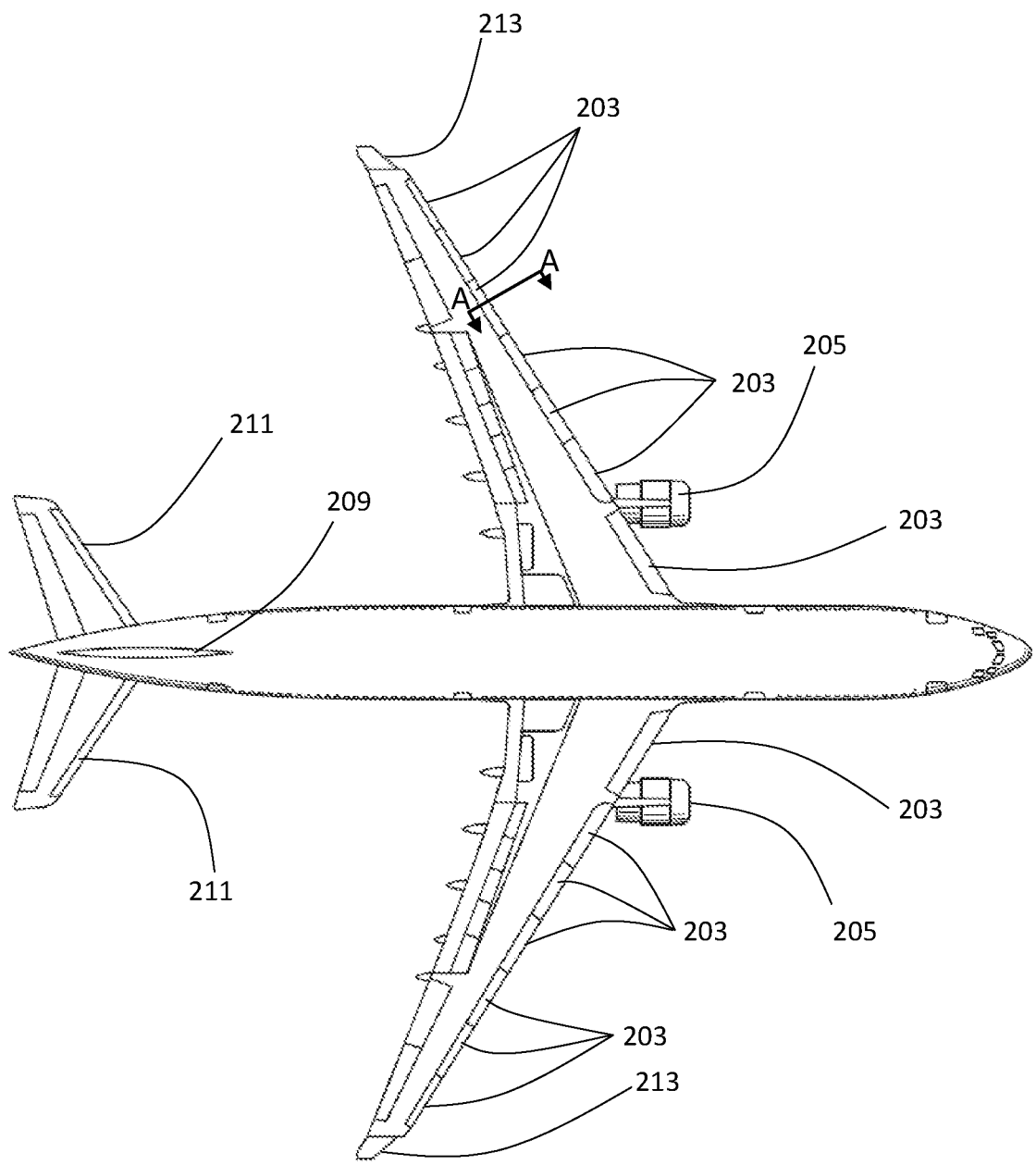
FIG. 2 is a plan view of the aircraft of FIG. 1.

With reference to FIG. 2, each wing comprises a set of high-lift devices called leading edge slats 203 which are mechanically connected to the leading edge of the wing 103. The slats are actuatable between a fully deployed position and a fully retracted position. The purpose of the slats 203 is to increase the camber and chord length and overall surface area of the wing 103 when deployed, thereby increasing the coefficient of lift that the wing 103 produces when required for slow flight of the aircraft. Each engine 105 comprises a nacelle configured with a leading edge 205, however such a leading edge structure is fixed, i.e., not configured to be moveable like the slats 203. Similarly, the vertical tail plane 109 and the horizontal tail plane 111 each comprise their own respective fixed leading edges 209 and 211.

Figure 3:
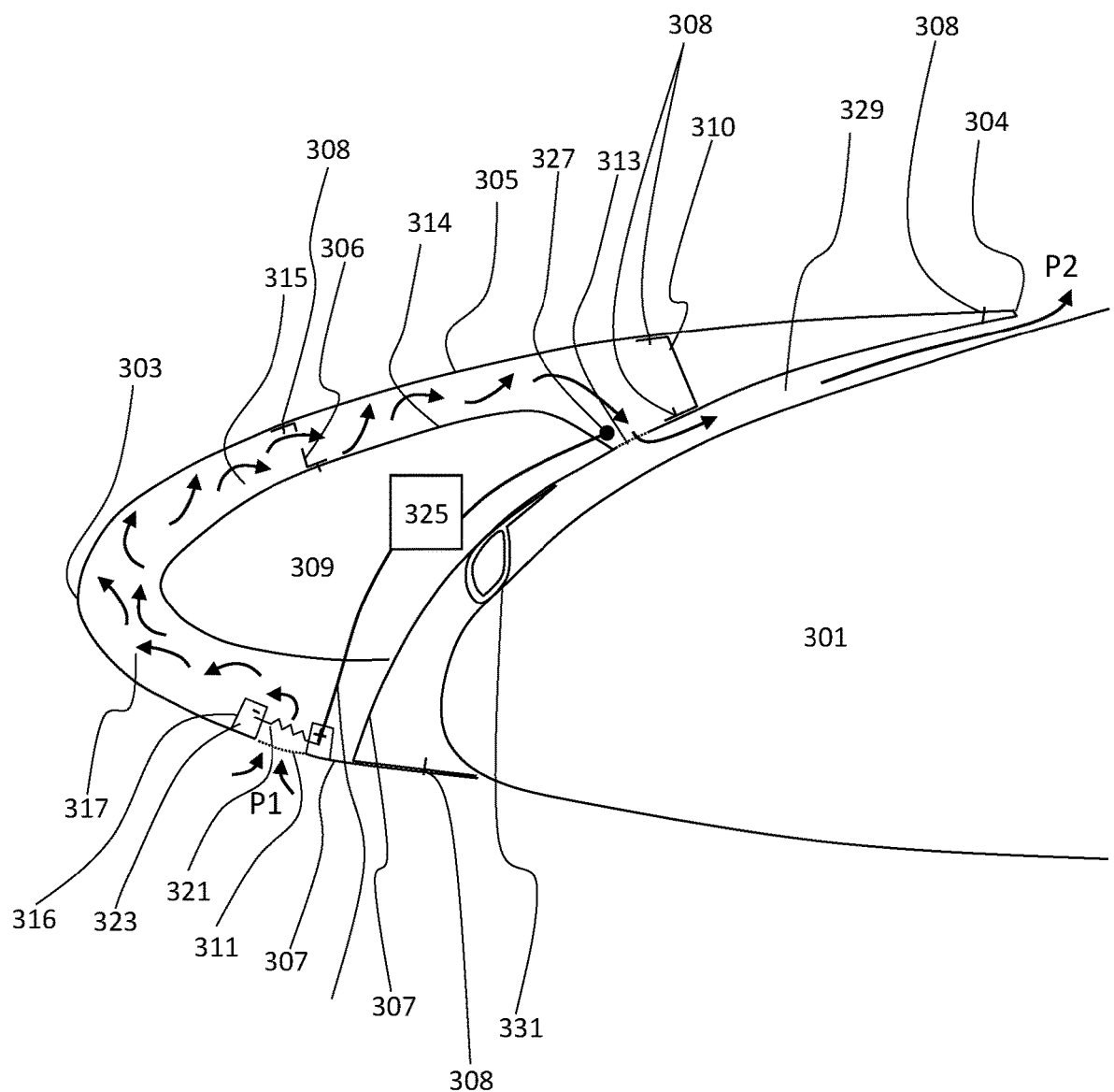
FIG. 3 is a cross-sectional view through a leading slat at the position shown in FIG. 2. The slat in this figure is shown in a retracted position.

With reference to FIG. 3, each leading edge slat 203 comprises an aerodynamic structure provided with an outer skin 302.

In the present embodiment shown, the slat 203 is mechanically held in a retracted position in close proximity to the leading edge 301 of the wing 103 such that a slot 329 is defined between a lower region of the slat 203 and an upper region of the leading edge 301 of the wing 103.

The outer skin 302 of the slat 203 is defined by a leading edge point 303 and a trailing edge point 304 that are interconnected by an upper skin 305 and a lower skin 307. The leading edge 303 point may be defined as the stagnation point on the surface of the slat 203, i.e., the point where during operation, the value where static pressure is at its maximum value and or where the flow is separated to flow externally in proximity to the upper skin 305 or lower skins 307. This may be a different position when the slat 203 is actuated between a retracted and deployed position. The trailing edge point 304 is where the upper skin 305 and lower skin 307 of the slat 203 may meet.

In the present embodiment, the upper skin 305 and lower skin 307 are formed from aluminum alloy sheet, such that an outer surface conforms to a desired aerodynamic shape of the slat 203. The skins 305 307 are connected to one another by rivets 308. Internal to the slat 203, a rear spar 310 interconnects the upper skin 305 and lower skin 307, so as to increase the torsional and bending stiffness of the slat 203.

An internal chamber 315 is enclosed within the outer skin 302 of the slat 203, i.e., by the upper skin 305 and lower skin 307, as well as by the rear spar 310 and an internal baffle 309. The internal baffle 309 is provided by a skin 314 mounted within the slat 203. The baffle 309 is formed from an aluminum sheet material which is offset from the upper skin 305 and lower skin 307 of the slat 203 and provides a substantially continuous span-wise surface within the slat 203. The baffle 309 may further be interconnected with the upper skin 305 by a stringer 306, which has openings within its web so as not to impede air flowing through the stringer 306. It should be appreciated that the structure of the slat 203 may be substantially formed of any known or suitable engineering material for such an application. For example, the slat 203 may substantially be formed from any combination of non-metallic or metallic material which may furthermore be reinforced.

The overall shape of the baffle 309 provides an internal chamber 315 with a convergent to divergent profile, i.e., a Venturi configured to create a passage or chamber wherein the air is accelerated or throttled, however, it may instead provide an internal chamber of substantially divergent to convergent profile or substantially constant profile.

It should be appreciated that the internal chamber 315 may still be defined by the outer skin 302 in the absence of the rear spar 310 and the internal baffle 309. In the present embodiment, the internal chamber 315 is configured to be in fluid communication with the air external to the outer skin 302 via an inlet 311 and an outlet 313, which are provided by the outer skin 302.

During operation, an external pressure difference will exist between the air flowing in proximity to the upper region and lower region of the slat 203. The air pressure in the upper region will be less than the air pressure in the lower region. Therefore, air at a higher pressure P1 will be drawn from lower region of air flow through the inlet 311, where it will then be drawn through the internal chamber 315 internal to the outer skin 302 of the slat 203 through to the outlet 313, which is in a region of low pressure P2.

Finally, the air from the outlet 313 is drawn through the slot 329 and is vented to the area of lowest air flow pressure along the upper surface between the slat 203 and the upper region of the wing 103. In the present embodiment, a sealing means 331 in the form of a span wise resiliently deformable seal, is installed at lower end of the slot 329 which prevents 'leakage' of air pressure between the upper and lower regions of the slat 203, therefore increasing the pressure difference between the inlet 311 and 313. The slot 329 may however be configured such that such a sealing means 331 is not required.

A heater 316 comprising a heater element 321 and a thermally insulated mount 323 chamber are attached to the structure of the slat 203 within the internal chamber 315 in proximity to the inlet 311. The thermally insulated mount 323 is formed of a silica material which is configured to prevent excessive heat energy being conducted directly from the heating element 312 to the surrounding structure of the slat 203. The heater 316 is configured to heat air drawn from the inlet 311 as it enters the chamber 315 before the air is then drawn through the chamber 315 to the outlet 313. The convergent divergent shape of the internal chamber ensures that the air drawn from the inlet 311 has sufficient exposure to heat radiated from the heater 316 before being accelerated or "throttled" under a Venturi effect away from the heater through the chamber 315 in proximity to the upper and lower skin 305 307, wherein the heat energy of the air is conducted. This conducted energy maintains the outer skin 302 of the slat 203 at a sufficiently high enough temperature that will be appreciated by the skilled person, such that it prevents ice accretion on the exterior surface of the slat 203 during operation, either in a retracted position or in a deployed position. The air then slows and is egressed from the outlet 313. A temperature sensor 327 is positioned within the chamber 315 in close proximity to the outlet 313 as shown or, alternatively, the sensor may be positioned external to the chamber 315. The temperature sensor 327 and heater element 321 are both connected to, and powered by, a control unit 325. The control unit 325 is configured to compare and maintain the temperature of the air passing through the chamber according to a predefined temperature.

Alternatively, the heater 316 may be simply connected to a power source and selectively turned on or off by the pilot or automatically commands from an ice protection system.

In any event, the sensor tolerances required to prevent overheating of the surrounding structure are much lower as the heating is provided indirectly by air and therefore this results in an ice protection system with much broader operating tolerances, few parts and therefore lower weight, cost and complexity to design, manufacture and maintain. The system may be sized such that the rated output of the heater 316 is matched to the thermal absorption properties of aerodynamic structure surrounding the chamber 315, taking in to account critical design cases that consider mass flow rate of the air, its temperature and its moisture content.

Figure 4:
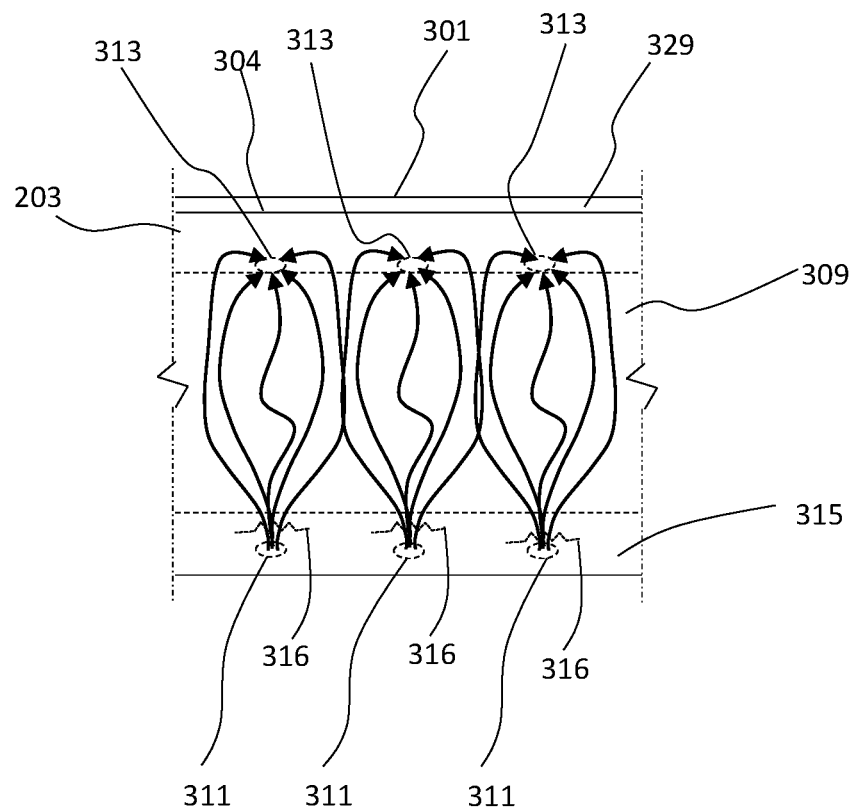
FIG. 4 is a front view of the leading edge slat of FIG. 3, with inner detail shown.

With reference to FIG. 4, an array of heaters 316, inlets 311 and outlets 313 is provided within a single slat 203. In the present embodiment, the heated airflow from each heater 316 position overlaps as it flows through the chamber to the nearest outlet 313. Using such an array ensures that substantially the whole of the outer skin 302 is provided with adequate ice-protection during operation. A slat 203 provided with an array comprising separated common units results in a product that has a high part commonality. Furthermore, having several heating units installed in one slat 203 enables safe operation between service intervals, should one heater 316 fail.

Where in the foregoing description, integers or elements are mentioned which have known, obvious or foreseeable equivalents; then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An ice-protection system for an aerodynamic structure for an aircraft comprising:
   an outer skin defined by a leading edge point and a trailing edge point that are interconnected by an upper skin and a lower skin;
   an internal chamber defined within the outer skin configured to be in fluid communication with the atmosphere external to the outer skin via an inlet and an outlet; and,
   at least one air heater provided within the chamber in proximity to the inlet.

2. The ice-protection system according to claim 1, configured such that, during use, a pressure differential exists between the inlet and the outlet that causes external air to flow through the chamber from the inlet to the outlet, and wherein the heater element is configured to heat the external air passing through the inlet such that the temperature of the air in the chamber is sufficiently increased to prevent ice accretion on the outer skin.

3. The ice-protection system according to claim 1, further comprising an internal baffle configured to define a passage between the inlet and the outlet.

4. An ice-protection system according to claim 3, wherein the internal baffle is configured to define a throttling passage that extends substantially along the leading edge and upper skin.

5. An ice-protection system according to claim 3, wherein the internal baffle is configured to define a throttling passage for air flowing through the internal baffle.

6. The ice-protection system according to claim 1, wherein the heater element is housed in a thermally insulated mount configured to prevent excessive heat energy being conducted directly from the heating element to the surrounding structure.

7. The ice-protection system according to claim 1, further comprising a temperature sensor positioned in proximity to the outlet and a control unit, wherein the control unit and sensor are connected to the heater element and are configured to maintain the temperature of the air passing through the chamber according to a preset temperature.

8. An aerodynamic structure for an aircraft having an ice-protection system, the system comprising:
   an outer skin of the aerodynamic structure defined by a leading edge point and a trailing edge point that are interconnected by an upper skin and a lower skin;
   an internal chamber defined within the outer skin configured to be in fluid communication with the atmosphere external to the outer skin via an inlet and an outlet; and,
   at least one air heater provided within the chamber in proximity to the inlet.

9. The aerodynamic structure according to claim 8, comprising a leading edge slat.

10. The aerodynamic structure according to claim 8, comprising a wing leading edge.

11. The aerodynamic structure according to claim 8, comprising a wing tip device leading edge.

12. The aerodynamic structure according to claim 8, comprising a horizontal tail plane leading edge.

13. The aerodynamic structure according to claim 8, comprising a vertical tail plane leading edge.

14. The aerodynamic structure according to claim 8, comprising an engine nacelle leading edge.

15. An aircraft comprising an aerodynamic structure and an ice-protection system according to claim 8.

* * * * *